C. C. WILSON.
COTTON PICKER.
APPLICATION FILED SEPT. 24, 1908.

915,816.

Patented Mar. 23, 1909.
4 SHEETS—SHEET 1.

C. C. WILSON.
COTTON PICKER.
APPLICATION FILED SEPT. 24, 1908.

915,816.

Patented Mar. 23, 1909.
4 SHEETS—SHEET 2.

Witnesses

Inventor

By his Attorney

C. C. WILSON.
COTTON PICKER.
APPLICATION FILED SEPT. 24, 1908.
915,816.
Patented Mar. 23, 1909.
4 SHEETS—SHEET 3.
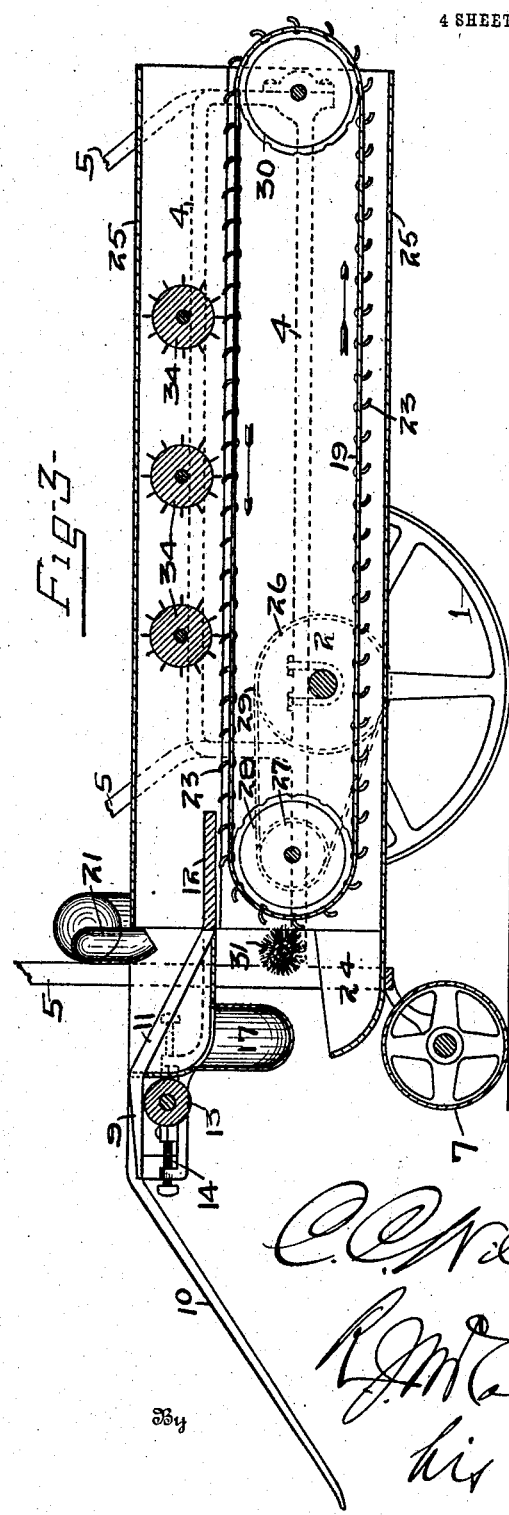

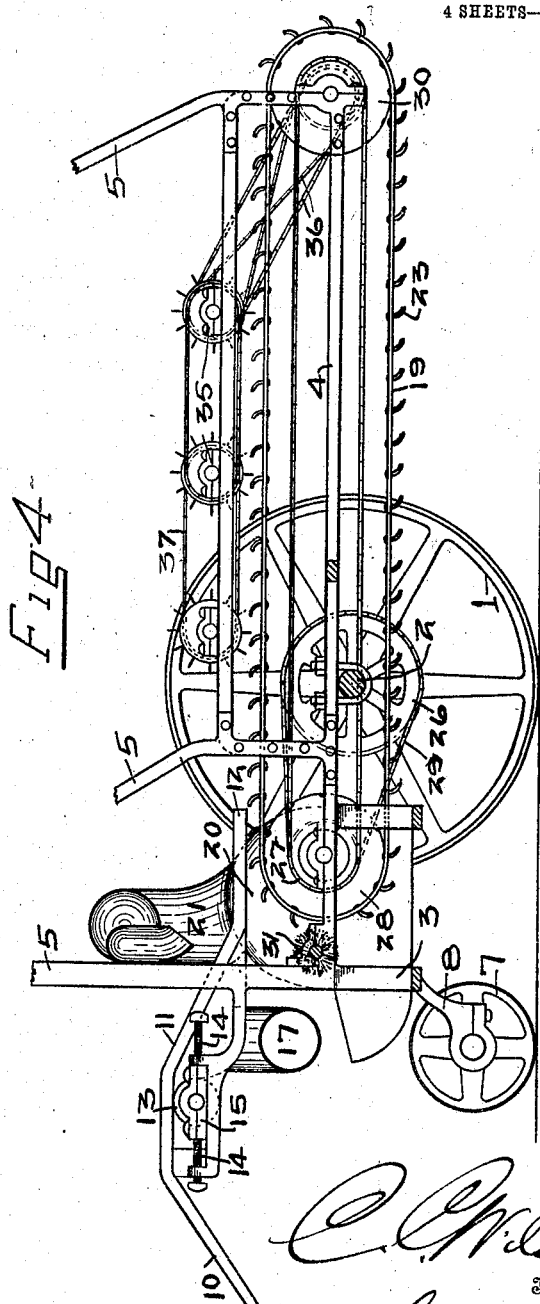

UNITED STATES PATENT OFFICE.

CHARLES C. WILSON, OF DELHI, LOUISIANA.

COTTON-PICKER.

No. 915,816.

Specification of Letters Patent.

Patented March 23, 1909.

Application filed September 24, 1908. Serial No. 454,553.

*To all whom it may concern:*

Be it known that I, CHARLES C. WILSON, a citizen of the United States, residing at Delhi, in the parish of Richland and State of Louisiana, have invented certain new and useful Improvements in Cotton-Pickers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in machines for picking cotton.

The object of the invention is to provide a machine having the special features hereinafter described and claimed, whereby cotton is successfully stripped from the stalks as the machine moves through the fields.

Preceding a detailed description of the invention, reference is made to the accompanying drawings, of which—

Figure 1:
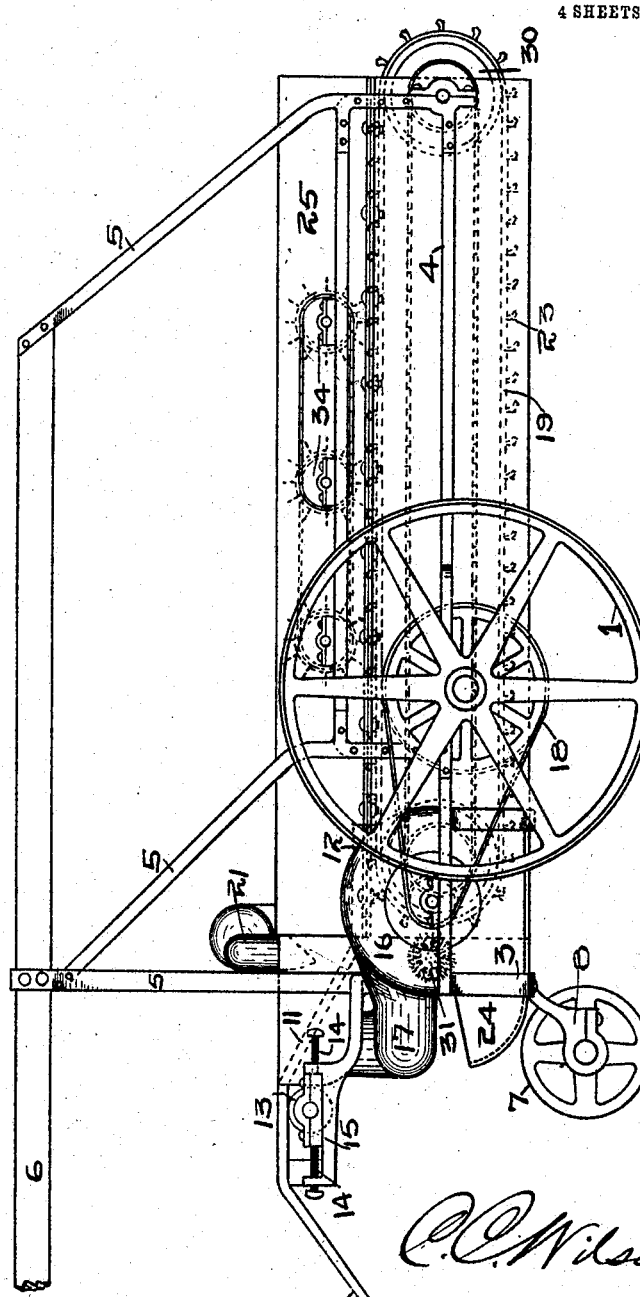
Figure 2:
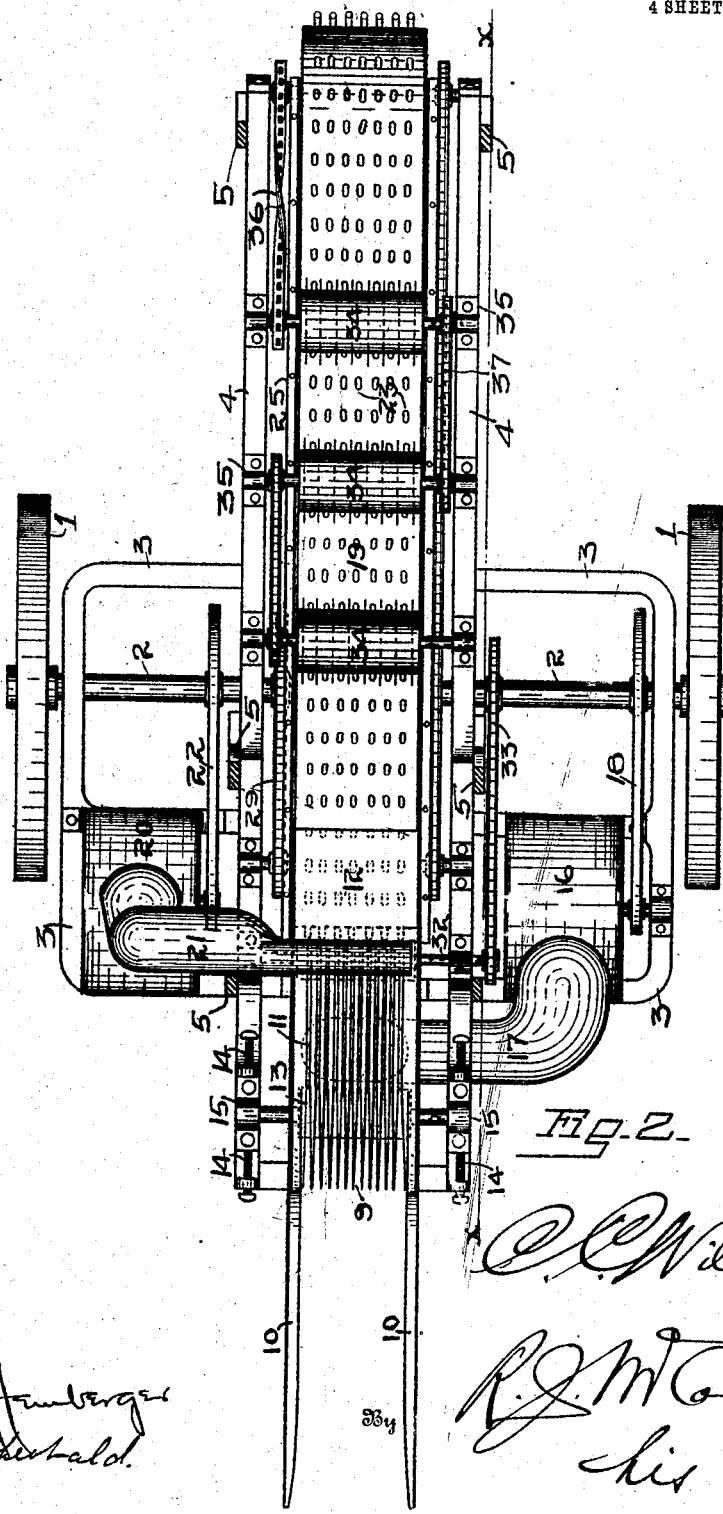

Figure 1 is a side elevation of my improved cotton picker. Fig. 2, is a top plan view of the same with a portion of the draft frame broken away. Fig. 3, is a longitudinal midsectional elevation. Fig. 4, is a sectional elevation on the line $x$ $x$ of Fig. 2, with the casing removed.

In a detail description of the invention, similar reference characters indicate corresponding parts.

In carrying out my invention, I provide means in the form of teeth which strip the cotton from the bolls on the stalks as they stand in the field; further means for furnishing air drafts which remove from the severed cotton any foreign matter, such as leaves, etc.; further means for furnishing air drafts which deliver said severed cotton to a rotating conveyer, which carries it to a receptacle, from which it is removed in any suitable manner.

The running gear comprises two main wheels 1 1 fixed to an axle 2 mounted in bearings in a frame 3; the latter frame supports two side frames 4 and the draft rigging 5 consists in part of the draft tongue 6' to which the draft animals are connected; the draft tongue 6 is partly broken away in Fig. 1. 7 designates a small pilot wheel at the front of the machine which is provided with bearings in brackets 8 fixed to the front portion of the running gear. The traction wheels 1 through their axle furnish the power utilized for operating the parts which pick the cotton. These parts consist of a series of picker teeth 9 which are so constructed as to permit of a greater space between the ends thereof; the said teeth are fixed and are integral with two inclined guide arms 10 which project forwardly from the front of the machine and serve to raise any fallen cotton stalks as the machine advances, and to present them in standing positions to the picker teeth 9.

Extending rearwardly from the picker teeth 9, and integral therewith, are inclined portions 11 consisting of a continuation of the teeth extending rearwardly and joining a horizontal table 12. The cotton picked from the bolls passes from the picker teeth 9 to the inclined portions 11, and from the latter to the horizontal table 12. The effective length of the teeth 9 may be regulated by a roller 13 which is adjustably mounted there-below. The adjustment of this roller may be rearward or forward and is accomplished through adjusting screws 14 which engage opposite sides of the bearings 15 for the journals of said roller; said bearings being supported upon the side frames of the machine. When the cotton is torn from the bolls and advanced to the inclined portions 11 of the picker teeth, it is subjected to an upward air draft of a sufficient strength only to blow any dust or foreign substance away from said cotton. This upward air blast is obtained by means of a blower 16 from which the air is directed through an extended casing 17 below the inclined portion of the picker teeth and is there delivered upwardly to the picked cotton. The blower 16 is supported on the draft frame 3 and is driven by means of a belt or chain 18 from the main axle 2, there being suitable wheels for said driving connection. A down draft of air is delivered to the cotton at the lower end of the inclined portion of the picker teeth to move said cotton onto the horizontal table 12, and thence to the endless belt carrier 19 to be again referred to. The down draft of air is maintained by means of a blower 20 which discharges the air through a blower pipe 21 above the inclined portion 11 of the picker teeth, and to the rearward of the extended casing 17. The blower 20 is operated from the main axle 2 by means of a belt or chain 22 and suitable wheels, and is placed on the side of the machine opposite that upon which the blower 16 is located.

The conveyer by means of which the severed cotton is removed to the portion of the machine for its final removal, consists of an endless belt 19 upon which is arranged a series of teeth 23 extending across said belt in rows. These teeth 23 are curved in a manner to engage the cotton delivered thereto from the table 12 and to carry said cotton forwardly beneath said table and to the receptacle 24 in the front end of the casing 25; the casing 25 is of sheet metal and incloses the entire machine, except at such points where it is necessary to enable access to be had to the front receptacle 24 for the removal of the cotton. The direction of movement of the carrier is indicated by the arrows in Fig. 3, and the movement is imparted to said carrier from the main axle 2 which has thereon a chain wheel 26 connected with a chain wheel 27 on the axle of the front chain wheel 28 around which the forward end of the carrier passes. The connection between the wheels 26 and 27 consists of a chain 29. The rearward end of the carrier passes around a chain wheel 30. The shafts of the chain wheels 28 and 30 have bearings in the side frames 4 of the running gear. It will thus far be seen that all the power necessary to operate the blowers and the carrier, is derived from the main axle of the machine. In the front of the machine near the carrier, there is a rotating brush 31, the shaft 32 of which is journaled in bearings on the side frames 4 and is driven from the main axle 2 by means of a chain 33 and suitable wheels. The purpose of this rotating brush is to clear the teeth 23 of any accumulations that may be disposed to cling thereto.

In order that the picked cotton may not advance too far rearwardly upon the carrier 19 when delivered thereto from the table 12, I provide a series of one or more rotating cylinders 34 with suitable projections thereon which rotate above the carrier in a manner to prevent the cotton from passing thereunder rearwardly upon the carrier. These rollers 34 have their shafts mounted in suitable bearings 35 on the upper portions of the side frames 4, and are driven from the rearward wheel 30 of the carrier by means of a cross chain 36 which passes around a suitable wheel on one of said roller shafts 34, and a further chain 37 which transmits motion to the remaining rollers 34.

As the machine is drawn forward by the draft animals, the cotton is stripped from the bolls. The rotating roller 13 below the teeth prevents the stalks from clogging up the teeth. The roller rotating under the teeth engages the retreating stalks and prevents them being forced back into the narrow space where the teeth are joined. The stalks are drawn through the teeth against the roller, have the effect of rotating the roller and the latter will prevent the clogging of the teeth. The teeth are so spaced that the stalks or bolls are allowed to enter them and to pass through said teeth while the cotton is stripped, and delivered to the rearward or inclined portion 11 of said teeth where it is subjected to the upward current of air. As the cotton accumulates upon said inclined portion of the teeth, the down draft of air delivered thereto, moves said cotton onto the table 12 and thence to the carrier which delivers it to the receptacle 24 in the lower forward portion of the casing 25.

I claim:

1. In a cotton picker, the combination with a series of picker teeth having portions extending rearwardly and downwardly, means for preventing the stalks of cotton from clogging said picker teeth, means for delivering a current of air to the severed cotton after it passes to the rearwardly inclined portions of the picker teeth, and means for delivering a current of air to the cotton to move it rearwardly, and an endless belt carrier with suitable teeth thereon, a receptacle to which said carrier delivers the cotton, and from which it is finally moved.

2. In a cotton picker, a table, a series of picker teeth having graduated spaces between them, said picker teeth having portions extending rearwardly and downwardly and joining the table, means for delivering upward and downward currents of air to the cotton after it passes to the rearwardly inclined portions of the picker teeth, and an endless belt carrier having suitable teeth thereon by which the cotton is removed to a part of the machine for its final removal from the machine.

3. In a cotton picker, a series of picker teeth terminating rearwardly and downwardly, a horizontal table joining the rearward inclined portions of said teeth, an adjustable roller mounted below the teeth to prevent the stalks of cotton from clogging said teeth, and an endless belt carrier having curved teeth thereon which engage the severed cotton as it is delivered thereto from the table.

4. In a cotton picker, a series of picker teeth having portions extending rearwardly and downwardly a table which is joined to said portions of the picker teeth, means for preventing the stalks of cotton from clogging the space between the picker teeth, a blower on each side of the picker teeth adapted respectively, to deliver up and down currents of air to the cotton after it is severed from the bolls, and an endless belt carrier adapted to remove the cotton to a receptacle within the machine.

In testimony whereof I affix my signature, in presence of two witnesses.

CHARLES C. WILSON.

Witnesses:
R. J. McCARTY,
J. FRED HEMBERGER.